March 7, 1967  C. KLEESATTEL  3,308,476
RESONANT SENSING DEVICES

Filed Jan. 21, 1964  3 Sheets-Sheet 1

INVENTOR.
CLAUS KLEESATTEL
BY
ATTORNEY

INVENTOR.
CLAUS KLEESATTEL

INVENTOR.
CLAUS KLEESATTEL

United States Patent Office 3,308,476
Patented Mar. 7, 1967

3,308,476
RESONANT SENSING DEVICES
Claus Kleesattel, 9841 64th St.,
Forest Hills, N.Y. 11959
Filed Jan. 21, 1964, Ser. No. 339,176
15 Claims. (Cl. 73—67.1)

This invention relates generally to resonant sensing devices which can be used either to determine or test the physical properties or characteristics of a test piece or to determine the magnitude of an applied force, as in a dynamometer, scale or load indicator.

I have previously disclosed, more specifically, in my co-pending application for U.S. Letters Patent identified as Ser. No. 154,235, filed Nov. 22, 1961, now Patent No. 3,153,338, that, when a mechanical resonating member is held in steady contact with a test piece or abutment at a contact surface having progressively increasing cross-sectional areas, as would be provided by a rounded contact tip on the resonating member, the resonant frequency of such member is dependent upon the degree of coupling between the resonating member and the test piece or abutment, and hence upon the surface compliance or hardness of the test piece and the magnitude of the force acting to hold the resonating member in steady contact with the test piece or abutment. In devices embodying the above principle and intended for the testing of materials, the mechanical resonating member has its rounded tip held in steady contact with the test piece by means of a constant or known force, and measurement is made of the change in the resonant frequency of the resonating member between its free condition, or its condition of contact with a standard test piece, and its condition of contact with the test piece being examined, such change in the resonant frequency being a function of the physical properties or characteristics, for example, the hardness, of the test piece. Alternatively, in material testing devices, the mechanical resonating member has its rounded tip held in contact first with a standard test piece or specimen and then with an unknown test piece, and the force urging the tip into contact with the respective test pieces is varied so as to achieve the same resonant frequency in both cases. The change in the force required to effect resonance at the same frequency is measured as a function of the hardness or other physical properties of the unknown test piece as compared with the standard specimen. Where the device is to be employed for measuring the magnitude of an applied force, as in a dynamometer, scale or load indicator, such force is effective to press the rounded contact tip of the mechanical resonating member against an abutment member of constant surface compliance and mechanical impedance, and the difference between the resonant frequencies for the non-loaded and loaded conditions is measured to indicate the magnitude of the applied load or force.

In the previously proposed resonant sensing devices, the mechanical resonating member is an elongated metal rod having a length equal to one, or any other whole multiple, of the half-wavelength of the compressional waves generated in the material of such rod at the frequency at which alternating current is supplied to an electrically energized means for effecting vibration of the rod. Such means for effecting vibration of the rod may be a piezo-electric crystal, or the rod itself may be formed of a magnetostrictive material around which an energizing coil is disposed to receive an alternating energizing current and a biassing direct current. In either case, the half-wavelength sensor rod is of substantially uniform cross-sectional area along its entire length except at the middle of the rod where a flange is provided. When the rod is vibrated in its free condition, that is, with the contact tip at one of its ends free of a test piece or abutment, loops of longitudinal motion occur at the opposite ends of the rod and a node of longitudinal motion occurs at the centrally located flange. Accordingly, in the devices having a half-wavelength sensor rod, the central flange is employed for mounting of the rod and for the transmission to the rod of the force for holding the tip of the latter in steady contact with a test-piece or abutment.

Although the flange by which the half-wavelength sensor rod is mounted is located at a node of the longitudinal motion in the rod for the free condition of the latter, the nodal point is displaced axially away from the flange when the tip at an end of the rod is held in steady contact with a test piece by an axial load or force applied to the rod through the flange. Thus, in the loaded condition of the sensor rod, there is substantial longitudinal motion in the region of the flange so that the clamping or mounting of the latter causes additional loading and damping of the vibration and thereby adversely affects the accuracy of the change in the resonant frequency between the free and loaded conditions. In order to provide substantial sensitivity or resolving power, the cross-sectional area of the half-wavelength sensor rod must be kept relatively small, in which case the strength against buckling under an axial load is also relatively small and thereby limits the maximum axial force that can be applied to the sensor rod. On the other hand, if the diameter or cross-sectional area of the rod is increased and the diameter of the mounting flange is also correspondingly increased, in order to provide greater strength against buckling and an enlarged area of support at the node, respectively, the effect is to reduce the resolving power or sensitivity of the device by diminishing the compliance of the rod. Further, with the half-wavelength rod having a mounting flange of relatively small diameter, it becomes necessary to laterally or radially support the rod at a location spaced axially from the flange at which the axial forces are applied. Such lateral support may be in the form of a centering bushing slidably engaging the sensor rod at a location where the latter is undergoing longitudinal vibrational movement, and this causes friction which may further result in an error in the change of the resonant frequency of the rod resulting from coupling with the test piece or abutment.

Accordingly, it is an object of the present invention to provide a sensor or mechanical resonating member which, when employed in resonant sensing devices of the described character, achieves very substantially increased resolving power or sensitivity, that is, shows a relatively great change in resonant frequency for a relatively small change in the degree of coupling thereof with a test piece or abutment member.

Another object is to provide a sensor having great tolerance to major frequency shifts so that large axial forces, of the order of 200 kg. and more, may be applied; and further which may be suspended in a manner to avoid virtually all damping interference with the vibrations in the sensor thereby to provide great accuracy in sensing changes in loading or in compliance at the coupling to the test piece or abutment.

In accordance with an aspect of this invention, a resonant sensing device of the described character is provided with a stepped sensor having a quarter-wavelength rod portion with a rounded tip at one end for contact with an abutment or test piece, and being joined, at the other end, to a body having a mechanical impedance very substantially greater than the mechanical impedance of the quarter-wavelength rod portion. Such body joined to the quarter-wavelength rod and having a very substantially larger mechanical impedance is preferably in the form of a cylinder of relatively larger diameter which is coaxial with the rod and has a radially directed flange extending from the end joined to the rod to provide for mounting of the latter over a relatively wide area. The vibration of the quarter-wavelength sensor rod may be effected by forming the latter of a magnetostrictive material and providing an energizing coil arranged around the rod to receive biassed alternating current at the resonant frequency of the rod, or a piezoelectric crystal can be interposed in the body of large mechanical impedance to generate the vibration for transmission to the quarter-wavelength rod at the resonant frequency of the latter.

The above, and other objects, features and advantages of the invention, will be apparent in the following detailed description of illustrative embodiments thereof which is to be read in connection with the accompanying drawing forming a part hereof, and wherein.

Figure 4:
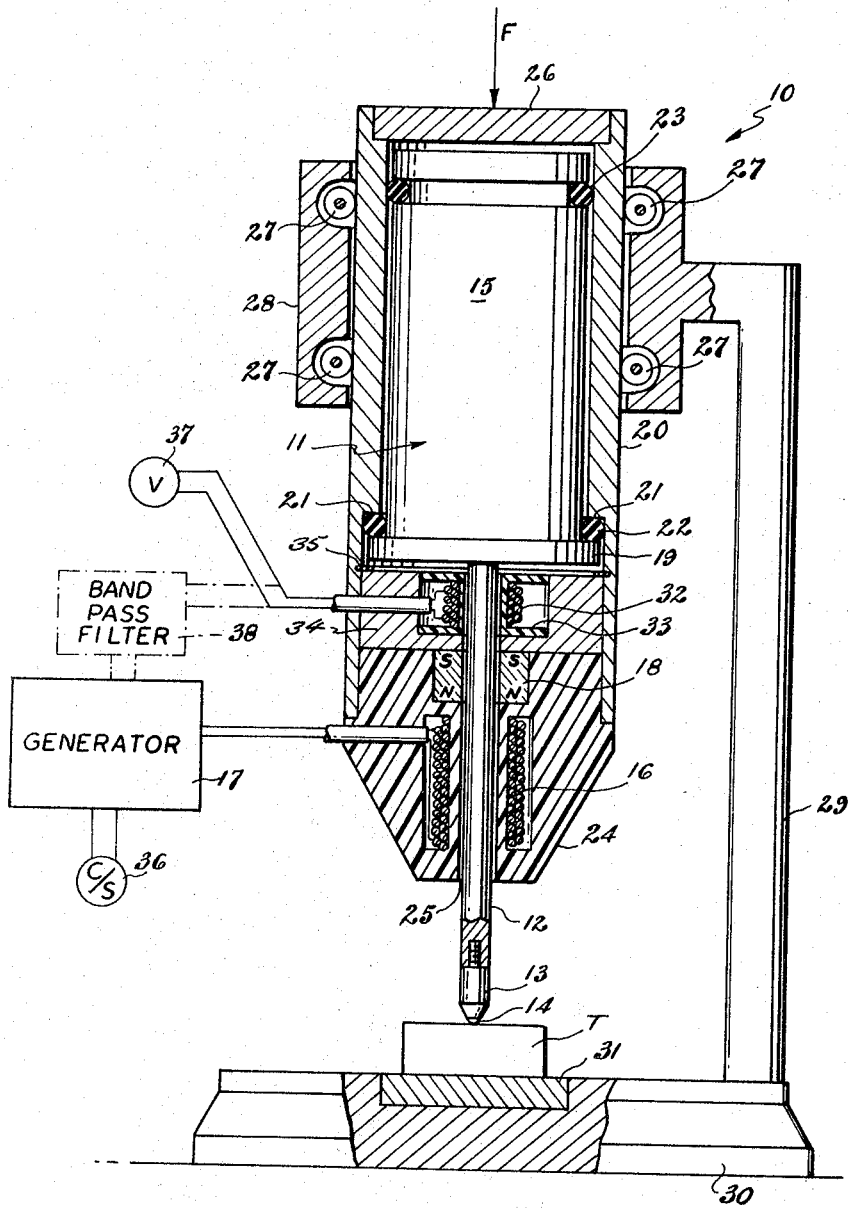
FIG. 4 is an axial sectional view of a resonant sensing device including a stepped sensor in accordance with this invention, and wherein the latter is vibrated at its resonant frequency by a magnetostrictive effect.

Referring to the drawings in detail, and initially to FIG. 4 thereof, it will be seen that a sensing device embodying the present invention and there generally identified by the reference numeral 10 includes a mechanical resonating member or sensor 11 in the form of an elongated rod 12 having a tapped, axial bore opening at one end to receive the stud of a holder 13 for a rounded contact tip of wear resistant material, such as diamond, sapphire or tungsten-carbide.

In accordance with this invention, the rod 12 has a length $L_1 = \lambda/4 + (n-1)\lambda/2$, in which $\lambda$ is the wavelength of the compressional wave produced therein at the resonant frequency of the rod when the contact tip 14 thereof is in its free condition, that is, free of any loading or restraint against longitudinal vibration of the contact tip; and $n$ is a whole integer. Thus, the length of rod 12 may be $\lambda/4$, $3/4\lambda$, $5/4\lambda$ and so forth. Further, in accordance with this invention, the sensor 11 includes a body 15 joined to the end of rod 12 remote from contact tip 14 of the latter and having a mechanical impedance Z that is substantially greater than the mechanical impedance of the rod 12.

The mechanical impedance Z for each of the body 15 and the rod 12 can be calculated from the following equation:

(1) $$Z = \rho C_L S$$

in which $\rho$ is the density of the material of the body or rod,
$C_L$ is the velocity of sound in that material, and
S is the cross-sectional area of the body or rod.

From the above it will be apparent that the body 15 can be given a substantially greater mechanical impedance than the rod 12 either by being formed of a different material having a greater density and greater velocity of sound therein than the corresponding characteristics of the material forming the rod 12, or, as in the embodiment of the invention illustrated on FIG. 4, by forming the body 15 as a cylinder aligned axially with the rod 12 and having a substantially greater diameter, and hence a substantially greater cross-sectional area. It has been found that, in order to achieve the objects of this invention, the mechanical impedance of the body 15 should preferably be at least ten times greater than the mechanical impedance of the quarter-wavelength rod 12. In the illustrated sensor 11, the body 15 is shown as having a length equal to that of the rod 12, that is, equal to a quarter-wavelength, but the length of the body 15 may be varied therefrom without affecting the operativeness of the sensor 11 for the purposes of this invention.

Electro-mechanical means are provided for effecting longitudinal vibration of the rod 12 at a resonant frequency of the latter. In the device 10 illustrated on FIG. 4, such vibration of the rod 12 is effected by forming the latter of a magnetostrictive material, for example, permanickel, nickel, permendur or other metals which have reasonably small band widths (high mechanical Q), so that the rod 12 will vibrate when polarized and subjected to the influence of an alternating electro-magnetic field established by the supplying of a suitable alternating current to an energizing coil 16 from a generator 17 of electrical oscillations. The magnetostrictive rod 12 may be polarized by a permanent ring magnet 18 which is also in surrounding relation to the rod, as shown on FIG. 4, or polarization may be effected by supplying a biassed alternating current from the generator 17 to the energizing coil 16. Since the rod 12 has a length equal to one-quarter the wavelength of the compressional waves generated in the material of the magnetostrictive rod at the frequency of the alternating current supplied to the energizing coil 16, a loop of the longitudinal vibrational movement of rod 12 occurs at or near its contact tip 14, and a node of the longitudinal vibrational movement occurs at or near the opposite end of rod 12 which is joined to the adjacent end of body 15 where the latter is formed with a radial flange 19.

The device 10 further generally includes a housing made up of a cylindrical shell 20 having a stepped internal bore to provide an upper portion receiving the body 15 with radial clearance therebetween, a lower portion from which the rod 12 projects downwardly, and a downwardly facing, radial shoulder 21 forming a seat for a rubber or other elastic ring 22 by which longitudinal thrusts or forces are transmitted from the housing shell 20 to the flange 19 of sensor 11. Radial alignment of the sensor 11 with respect to the housing shell 20 is effected by a rubber or other elastic ring 23 interposed therebetween and spaced axially from the location of the main support or mounting of sensor 11 provided by the ring 22. The housing of device 10 further may include an end piece 24 of insulating plastic material suitably secured in the lower end of housing shell 20 and enveloping the energizing coil 16 and polarizing magnet 18 around a central bore 25 through which rod 12 projects. The upper end of housing shell 20 is closed by a top plate 26 to which a downwardly directed force or thrust F may be applied, for example, by weights placed upon top plate 26 or by a spring (not shown) acting against the latter.

The housing shell 20 is guided for vertical movement by rollers 27 provided at angularly and vertically spaced apart locations within a collar 28 which is supported, as by a post 29, above a base 30 so that the force F applied to the top plate 26 of the housing will be effective to hold the contact tip 14 either against a test piece T resting on the base 30 or against a standard piece or abutment 31 which is inset in the base. In order that the contact tip 14 will be held in steady contact with the test piece T or the standard piece 31, that is, without separating from the latter or tapping as a result of the vibration of rod 12, the force F applied to the rod 12 through the resilient or rubber ring 22 is sufficiently large so that the downward acceleration of sensor 11 and its housing resulting from the force F will be greater than the upward acceleration of the contact tip 14 resulting from the longitudinal vibration of rod 12.

The rod 12 has a particular resonant frequency when it is vibrated in its free condition, that is, with its contact tip 14 out of engagement with either the test piece T or standard piece 31. However, when the contact tip 14 is held in steady contact with the test piece by a force F, rod 12 has a different resonant frequency, and the change in the resonant frequency of the rod 12 is a function of the degree of coupling thereof, at its rounded tip 14, to the test piece T or standard piece or abutment 31. The degree of coupling of the tip 14 of rod 12 to the test piece or abutment is, in turn, dependent upon the area of contact therebetween which varies with the magnitude of the force F and the surface compliance of the test piece or abutment. If the force F is maintained constant, then the change in resonant frequency is a function of the surface compliance and/or plastic deformation of the test piece, thereby making it possible to ascertain the hardness of the latter. On the other hand, if the tip 14 of rod 12 is engaged with the standard piece or abutment 31, that is, with a member of known or constant hardness sufficient to exclude permanent deformation, then the change in resonant frequency is determined only by variation in the force F and the device 10 can be employed as a scale or dynamometer.

In order to permit determination of the change of resonant frequency as a measure of either the hardness of the test piece T or the magnitude of the load or force F, the device 10 further includes a pick-up coil 32 wound on a coil form 33 which extends around rod 12 within housing shell 20 at a location adjacent the end of rod 12 joined to body 15, that is, at a location near a node of longitudinal motion which corresponds to a location of maximum stress. The pickup coil 32 is surrounded by a metal shielding member 34 which reduces the cross feed from the energizing coil 16 and which is held in position against member 24 by means of a retaining ring 35.

It will be apparent that an alternating voltage is induced in pickup coil 32 by reason of the vibration or magnetostrictive rod 12, and that such voltage is induced at the frequency of vibration of rod 12 and has a magnitude corresponding to the amplitude of the vibrations. In the control circuit represented schematically in full lines on FIG. 4, the electrical oscillation generator 17 is manually tunable within a suitable range of frequencies and is connected to a conventional frequency meter 36 indicating the frequency at which electrical oscillations are supplied to the energizing coil 16, while the pickup coil 32 is connected to a vacuum tube voltmeter 37 operative to indicate the magnitude of the voltage induced in the pickup coil and hence the amplitude of the vibrations of rod 12.

In operating the above described sensing device 10 as a hardness tester or meter, the generator 17 may be initially tuned to effect resonant vibration of the rod either in the free condition of the latter or with the tip 14 of the rod held in steady contact with a standard piece of known hardness by a known force F. This initial resonant frequency is noted on the meter 36 when the voltmeter 37 shows a maximum deflection corresponding to the maximum amplitude of vibration characteristic of the resonant vibration of rod 12. Thereafter, the tip 14 of rod 12 is held in steady contact with a surface of the test piece T by means of the same known force, the generator 17 is retuned until the voltmeter 37 again indicates that the rod 12 is being vibrated at a resonant frequency thereof, whereupon this resonant frequency is noted on the meter 36. The difference between the initially noted resonant frequency and the resonant frequency during contact with the test piece T is a measure of the surface hardness of the test piece.

The described device 10 may also be operated as a hardness tester or meter by holding its contact tip 14 in steady contact with a standard piece of known hardness by the application of a force F sufficient to cause resonant vibration thereof at the frequency at which electrical oscillations are supplied to the energizing coil 16, and then adjusting such force when the contact tip 14 contacts the unknown test piece to again cause the rod 12 to resonate at the fixed frequency, with the change in the applied force being a measure or indication of the hardness of the unknown test piece.

On the other hand, when the device 10 is to be employed as a scale or dynamometer for indicating the magnitude of the applied load or force F, then the contact tip 14 of the rod is engaged with the standard piece or abutment 31 of known hardness, and the frequency meter 36 is calibrated to directly indicate the magnitude of the applied force. During operation as a scale or dynamometer, the generator 17 is tuned to supply electrical oscillations to the energizing coil 16 at the resonant frequency of the rod 12 which, at all times, depends upon the magnitude of the force F.

If desired, as shown in broken lines on FIG. 4, the voltmeter 37 can be eliminated and the pickup coil 32 can be connected through a band pass filter 38 to the generator 17 which is of a conventional feedback type so that the output frequency of the generator 17 is automatically varied to correspond to the resonant frequency of the rod 12 in accordance with the feedback voltage supplied to the generator from the pickup coil 32. The band pass filter 38 is selected to pass feedback only in the desired range of frequencies. With this alternative arrangement, the rod 12 is always vibrated at a resonant frequency thereof and it is only necessary to note the difference between the resonant frequencies indicated by the meter 37 when the contact tip 14 is engaged with different test pieces, or held in contact with a standard test piece or abutment by different or varying applied forces.

Figure 5:
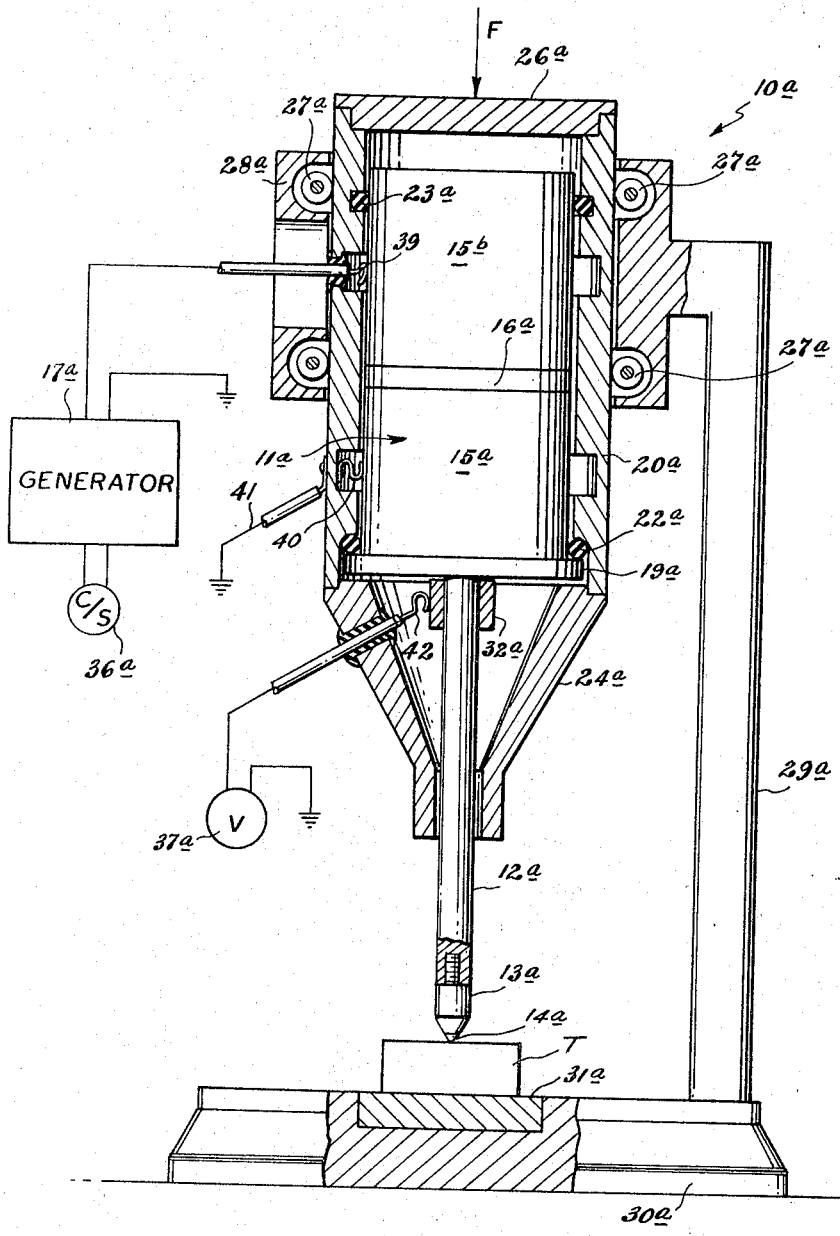
FIG. 5 is a view similar to that of FIG. 4, but wherein the vibrations of the sensor are produced by a piezoelectric crystal.

Referring now to FIG. 5, it will be seen that a sensing device embodying this invention and there generally identified by the reference numeral 10a has its several parts identified by the same reference numerals employed in connection with the description of the corresponding parts of the device shown on FIG. 4, but with the letter a appended thereto. In the device 10a, longitudinal vibration of the rod 12a at a resonant frequency thereof is effected by a piezo-electric crystal 16a of the thickness expander type suitably cemented or sandwiched between portions 15a and 15b of the body having a relatively high mechanical impedance, preferably at least ten times greater than the mechanical impedance of the rod 12a, and which is joined to the end of the latter remote from the contact tip 14a. The crystal 16a is located at a distance from the area transition between the high impedance body and the rod 12a so as to be located at a region of uniform stress distribution across the body, for example, at a distance from the area transition which is approximately equal to one-eighth the wavelength of the compressional wave produced in a rod 12a at the resonant frequency in the free condition of the latter for the relative dimensions shown. Further, in place of the pickup coil 32 of the previously described device 10, the device 10a has a piezoelectric pickup crystal 32a in the form of a cylindrical shell cemented on the rod 12a at its region of highest alternating stress, that is, adjacent the end of rod 12a connected to body portion 15a. There is radial motion in this region due to the Poisson contraction, so that the crystal 32a may be either sensitive to such radial motion or strain-sensitive.

In order to energize the thickness expander crystal 16a, the body portion 15b of sensor 11a, which body portion constitutes a backing piece for the crystal, has a contact spring 39 welded thereto, and connected to a lead extending to the oscillation generator 17a, and a contact spring 40 is welded to the body portion 15a and the housing shell 20a which is grounded, as at 41. A contact spring 42 is welded to the pickup crystal 32a and to a shielded wire extending to the voltmeter 37a by which the occurrence of vibration at the resonant frequency is indicated. In order to shield the pickup crystal 32a against interference, the lower portion or end piece 24a of the housing is preferably formed of metal. It will be apparent that the sensing device 10a may be operated in the manner indicated above with respect to the device 10 for either measuring the hardness or other surface characteristics of a test piece T, or for measuring the magnitude of a load or force F applied downwardly to the top 26a of the housing.

Figure 1:
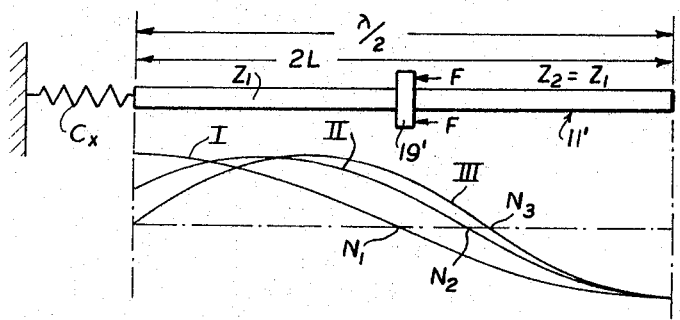
FIG. 1 is a diagrammatic view of a half-wavelength sensor rod, as employed in prior resonant sensing devices, and showing the amplitude distribution along the rod during resonant vibration thereof under different loading conditions.
Figure 2:
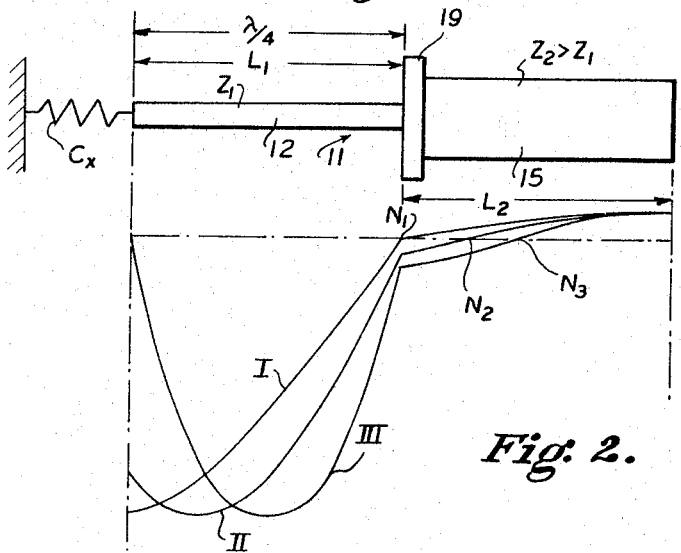
FIG. 2 is a diagrammatic view similar to that of FIG. 1, but showing the amplitude distribution along a sensor embodying the present invention when subjected to different loading conditions.

The advantages of the device 10 or 10a having a stepped sensor 11 or 11a over the previously proposed devices having a half-wavelength sensor rod of uniform cross-sectional area will be apparent from consideration of FIGS. 1 and 2.

In the case of the half-wavelength rod 11 (FIG. 1) having a flange 19′ at its midpoint by which the sensor rod is mounted, the mechanical impedance Z, of the rod at one side of flange 19′ equals the mechanical impedance $Z_2$ at the opposite side of the flange, and a node $N_1$ of the longitudinal motion occurs at such flange, that is, at the midpoint, only when the rod is in its free condition, that is, vibrating in its $\lambda/2$ mode, with the compliance, represented at $C_x$, at the contact tip of the rod being infinite. The amplitude distribution along the rod in its free condition is represented by the curve I, which shows the maximum amplitudes occuring at the ends of the rod. However, when the contact tip of the rod is pressed or held in steady contact with a test piece or abutment by a force applied axially at the flange 19′, as represented by the arrows F, the compliance $C_x$ has a finite value and therefore loads the rod so that the node is shifted from the midpoint of the rod, for example, to the position $N_2$, and the resonant frequency increases with the standing wave on the rod covering more than $\lambda/2$, as indicated by the curve II on FIG. 1. Finally, in the clamped condition, that is, when $C_x$ is zero, the amplitude at the left-hand end of the rod is zero and the wave on the rod covers $3\lambda/2$, which represents a frequency increase of 50%. In the clamped condition, the node of the wave is further shifted from the midpoint to the position $N_3$. It will be apparent that the nodal shift represented by curves II and III on FIG. 1 results in relatively large amplitudes of vibration at the flange 19′, that is, at the region of support of the rod, thus causing additional loading and damping of the rod and adversely affecting the accuracy with which the measured change of resonant frequency reflects the hardness of the contacted test piece or the magnitude of the force holding the tip of the rod in steady contact with the test piece or abutment.

Referring now to FIG. 2, in which the length $L_2$ of body 15 has been taken as equal to the length L, of rod 12 merely for simplification of analysis, it will be seen that, in the case of the stepped sensor 11 embodying this invention and having a quarter-wavelength rod 12 with a mechanical impedance $Z_1$ substantially smaller than, preferably, less than one-tenth, the mechanical impedance $Z_2$ of the body 15 extending from the end of rod 12 remote from its contact tip, the free-condition (curve I), when $C_x$ is infinite, provides an amplitude distribution composed of two quarter sine waves with different maximum values of displacement according to the $Z_2/Z_1$ ratio. Thus, if $Z_2/Z_1$ is 10, the amplitude at the contact tip end of rod 12 is ten times as great as the amplitude at the end of body 15 remote from rod 12, and a node $N_1$ occurs at the flange 19. When $C_x$ has a finite value (curve II) or is reduced to zero (curve III for the clamped condition), the node moves from the position $N_1$, for example, to the positions $N_2$ and $N_3$, which are displaced even greater distances from flange 19 by reason of the relatively greater frequency variation, as hereinafter described in detail. However, if the maximum amplitude of vibration of rod 12 is made equal to the maximum amplitude of sensor rod 11′, the amplitude of vibration in the region of the flange 19, for the loaded condition of sensor 11, will be very substantially smaller than the amplitude of vibration in the region of the flange 19′ for the loaded condition of sensor 11′. Thus, the nodal shift will have far less effect on the accuracy of the sensor 11 embodying this invention.

As noted above, the change in resonant frequency of the sensor when held in steady contact with a test piece or abutment is far greater in the case of the stepped sensor 11 embodying this invention than in the case of the $\lambda/2$ sensor rod 11′. The resonance equation is as follows:

$$(2) \qquad \tan^2 \alpha + \frac{\alpha}{K}(1+Z_1/Z_2) \tan \alpha = Z_1/Z_2$$

in which $\alpha$ is the ratio of the length of the rod ($L_1=L_2=L$) to the wavelength $\lambda$ of the standing wave on the rod $12 = 2\pi L/\lambda = 2\pi f L/C_L$,
K is the compliance ratio $C_1/C_x$,
$C_1$ is compliance of rod $12 = L/ES$,
E is Young's modulus of rod 12,
S is cross-sectional area of rod 12,
$C_x$ is unknown compliance in the contact area between the test piece and the contact tip 14,
K can also be written as $L/ESC_x$,
$Z_1$ is mechanical impedance of rod 12 (see Equation 1), and
$Z_2$ is mechanical impedance of body 15.

Figure 3:
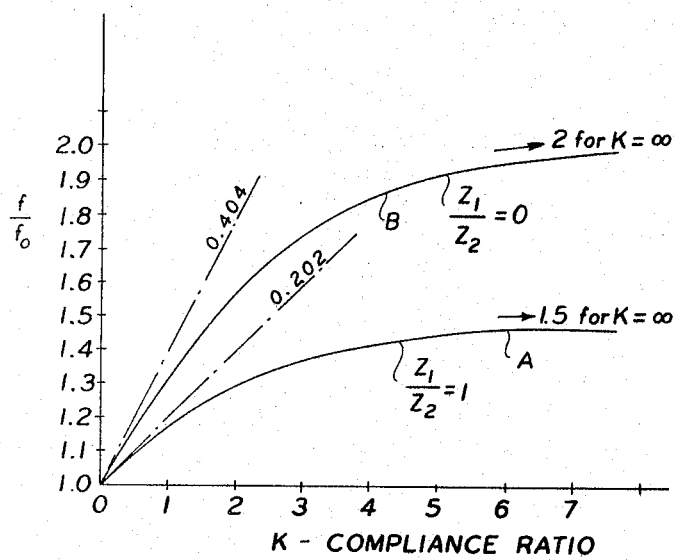
FIG. 3 is a graphic representation of the relationship between the ratio of the resonant frequencies of the sensor in the loaded and free conditions and the compliance ratio for the previously employed half-wavelength sensor rod and for the stepped sensor having a quarter-wavelength rod portion in accordance with this invention.

FIG. 3 illustrates the variation of the resonance frequency of the sensors as a function of the tip loading to which the compliance ratio K corresponds, with curve A relating to the sensor 11′ of $\lambda/2$ length having $Z_1=Z_2$ and curve B relating to the sensor 11 having a rod 12 of $\lambda/4$ length and the extreme condition of $Z_2$ being infinite so that $Z_1/Z_2=0$. On the curves of FIG. 3, $f$ is the resonance frequency when the tip of the sensor is in contact with a test piece, and $f_0$ is the resonance frequency when the tip is free.

The initial slope of the frequency curve, that is $f/f_0$ a a function of K, at $K=0$, can be found from the following equation:

$$(3) \qquad \frac{1}{\alpha_0}\cdot\frac{d\alpha}{dK} = \frac{1}{f_0}\cdot\frac{df}{dK} = \frac{4}{\pi^2(1+Z_1/Z_2)}$$

In the free-end condiiton, $C_x=\infty$, $K=0$ and $f=f_0$.

From Equation 3 it will be apparent that, in the case of curve A where $Z_1=Z_2$, or $Z_1/Z_2=1$, the initial slope is $2/\pi^2$ or 0.202. On the other hand, in the extreme case representing this invention, that is, $Z_2$ is infinite or $Z_1/Z_2=0$ (curve B), the initial slope is $4/\pi^2$ or 0.404, as shown.

The "ceiling" of $f/f_0$, that is the maximum value of $f/f_0$ occurs for the clamped end condition, that is, when $C_x=0$ and K is infinite. Substituting the later value for K in Equation 2, it is found:

$$(4) \qquad \tan \alpha(\max.) = \pm\sqrt{Z_1/Z_2}$$

In the case of $Z_1/Z_2=1$ (curve A), $\alpha(\max.)$ is $.75\pi$, whereas, in the case of $Z_1/Z_2=0$ (curve B), $\alpha(\max.)$ is $\pi$. In each case, $\alpha_0$ (at $K=0$) is $2\pi L/\lambda$ or $2\pi L/4L$, that is, $\pi/2$. Since $$\frac{f}{f_0} = \frac{\alpha}{\alpha_0}$$

$$\frac{f}{f_0}(\text{max.}) = \frac{2}{\pi}\alpha(\text{max.})$$

Thus, when $Z_1/Z_2$ is 1 (curve A) and $\alpha(\text{max.})$ is $.75\pi$, $f/f_0(\text{max.})=1.5$, whereas, when $Z_1/Z_2$ is 0 (curve B) and $\alpha(\text{max.})$ is $\pi$, $f/f_0(\text{max.})=2.0$.

The greater initial slope of curve B and the higher maximmu value for $f/f_0$ show that the sensor 11 embodying this invention is far more load sensitive than the sensor 11' and hence has superior resolving power. Thus, for a given change in the compliance $C_x$ at the area of contact of the tip of the sensor with a test piece, the sensor 11 will undergo a larger change in its resonance frequency than the sensor 11'. Although the curve B of FIG. 3 is for a theoretical sensor having $Z_1/Z_2=0$ and, in actual practice, the impedance $Z_2$ of the body 15 always has a finite value so that the frequency for the clamped condition ($C_x=0$ and K is infinite) will not quite reach $2f_0$, the difference is not significant. For example, for the clamped condition ($C_x=0$ and K is infinite), a stepped sensor embodying this invention and having $Z_1/Z_2=0.025$ shows a "ceiling" of the frequency ratio $f/f_0=1.9$ which is still substantially greater than the 1.5 value attained with the sensor rod 11' in which $Z_1=Z_2$. However, even this difference in the "ceilings" of the frequency ratios is of relatively minor importance as, in practice, the value of K will rarely exceed 2. Thus, the initial slopes of the frequency curves are of the utmost importance and, as pointed out above, the initial slope of curve B representing the present invention is far greater than the initial slope of curve A, thereby affording relatively higher resolving power to the device 10 having the stepped sensor 11. Such relatively high resolving power can make possible the detection of small variations in the hardness or other surface properties of the test piece or in the load or force, or the use of less expensive means for read-out, such as, the frequency meter 36 or other indicating means.

In order to demonstrate the superiority of a sensor embodying the present invention, hereinafter referred to as a "stepped sensor," having a total length of $\lambda/2$ and a ratio $Z_2/Z_1=30$, over a sensor of equal length and $Z_1=Z_2=Z_1$ of the stepped sensor, which is hereinafter referred to as a "straight sensor," both sensors were operated at $K=0.5$, with the following results:

(a) Increase in resonance frequency over $f_0$:
 stepped sensor—16.45%,
 straight sensor—9.05%.
(b) Initial slope of frequency curve $1/f_0 \cdot df/dK$ ($K=0$):
 stepped sensor—.392,
 straight sensor—.202, which represents an increase of 95% in load sensitivity.
(c) maximum frequency increase for clamped condition (K is infinity):
 stepped sensor—88.5%,
 straight sensor—50.0%.
(d) Ratio of amplitude at end remote from contact tip to amplitude at contact tip (for $K=0.5$):
 stepped sensor—3.6%,
 straight sensor—104%.
(e) Ratio of amplitude at center point (mounting flange) amplitude at contact tip (for $K=0.05$):
 stepped sensor—0.92%,
 straight sensor—14.8%.

Thus, the mounting of the stepped sensor at its middle flange 19 will not cause further significant loading or damping thereof and will not substantially affect the accuracy with which the variation of resonance frequency reflects a change in the compliance at the area of contact of the tip with the test piece.

(f) Ratio of amplitude at point along sensor spaced from end remote from contact tip by distance of approximately $\lambda/16$ (approximate location of centering ring 23 on FIG. 4) to amplitude at contact tip:
 stepped sensor—3.23%,
 straight sensor—95%.

Thus, the centering ring 23 will not cause detrimental damping of the stepped sensor, whereas the straight sensor has no such low amplitude region spaced substantially from the mounting flange to permit engagement by a centering ring without damping.

In the above example, the cross-sectional area and compliance $C_1$ of the rod 12 of the stepped sensor 11 have been taken to be equal to the cross-sectional area and compliance of the straight sensor with which it is compared, so that K is the same in each case. Since $C_1=L/ES$ and $K=C_1/C_x$, it is apparent that the resonance frequency for any particular compliance $C_x$ at the area of contact with the test piece can be increased, thereby increasing the sensitivity of the device, by reducing the cross-sectional area of the sensor rod. In the case of the straight sensor 11', the minimum cross-sectional area is determined by buckling-strength consideration and the small area of support afforded by the flange 19' does not appreciably reduce the susceptibility to buckling. However, in the case of the sensor 11 embodying this invention, the flange 19 projects beyond the relatively large diameter of body 15 and thus provides a large area of support so that the cross-sectional area of rod 12 can be reduced and yet have the same resistance to buckling. In thus designing a stepped sensor having the same structural strength as a straight sensor, it has been found that the stepped sensor may be provided with a frequency curve, that is a slot of $f/f_0$ against K, having an initial slope of .57 which represents a resolving power 180% superior to that of the straight sensor of equal strength.

By way of summary, it will be noted that sensing devices provided with stepped sensors in accordance with this invention have much improved sensitivity and resolving power; can tolerate large axial forces for pressing the contact tip of the sensor against a test piece without appreciable damping at the regions of support by reason of the maintenance of small amplitudes at such regions of support, thereby making it possible to operate with relatively large values of K; and further permit radial or lateral support without damping, as by the ring 23. Thus, devices embodying the invention are capable of accurately detecting small changes in the hardness or other surface properties of a test piece or in the load or force urging the sensor against an abutment.

Although illustrative embodiments of the invention have been described in detail herein with reference to the accompanying drawings, it is to be understood that the invention is not limited to those precise embodiments and that various changes and modifications may be made therein without departing from the scope or spirit of the invention, except as defined in the appended claims.

What is claimed is:

1. A resonant sensing device comprising an elongated metal rod having a tip at one end with a rounded contact surface adapted to engage a solid member so that the resonance frequency of said rod is dependent upon the compliance at the area of contact of said tip with the solid member, electrically energized means for longitudinally vibrating said rod at said resonance frequency of the latter, said rod having a length equal to $\lambda/4+(n-1)\lambda/2$, in which $\lambda$ is the wavelength of the standing wave on the rod at the resonance frequency of the latter for infinite compliance at said tip and $n$ is a whole integer, a body joined to the other end of said rod and having a mechanical impedance substantially greater than the mechanical impedance of said rod so that the resonance frequency of said rod is subject to relatively large changes in response to changes in said compliance at the area of contact of said tip and said body has small amplitudes of vibration therealong as compared with the amplitude of vibration at said tip, and means for applying an axial force to said rod at said other end in the direction toward said one end so that the compliance at the area of contact of the tip with the solid member is determined by the surface characteristics of said member and the magnitude of said force.

2. A resonant sensing device as in claim 1; wherein said mechanical impedance of the body is at least ten times as great as said mechanical impedance of the rod.

3. A resonant sensing device as in claim 1; wherein said body is formed as an axial extension of said rod having a cross-sectional area at least ten times as large as the cross-sectional area of the rod.

4. A resonant sensing device as in claim 3; wherein said body has a flange extending therefrom at the end adjacent said rod, and said means for applying an axial force to the rod acts against said flange where the amplitude of vibration is small in relation to said amplitude at the tip even when the resonance frequency is substantially higher than said frequency for infinite compliance, thereby to avoid significant damping of the vibration.

5. A resonant sensing device as in claim 4; further comprising means engaging said body at a location therealong spaced from said flange for guiding said rod laterally with respect to the longitudinal axis of the rod while avoiding significant damping of the vibration.

6. A resonant sensing device as in claim 1; wherein said rod is of a polarized magnetostrictive material, and said means for longitudinally vibrating the rod includes an emergizing coil extending around said rod, and generating means supplying electrical oscillations to said coil at the resonance frequency of said rod.

7. A resonant sensing device as in claim 1; wherein said means for longitudinally vibrating the rod includes a piezo-electric crystal interposed in said body, and generating means supplying electrical oscillations to said crystal at the resonance frequency of the rod.

8. A resonant sensing device as in claim 1; further comprising means for indicating when said rod is vibrating at a resonance frequency thereof, and means for indicating the value of the resonance frequency at which the rod is being vibrated.

9. A device for indicating the surface characteristics of a test piece comprising an elongated metal rod having a tip at one end with a rounded contact surface adapted to engage the test piece so that the resonance frequency of said rod is dependent upon the compliance at the area of contact of said tip with the test piece, electrically energized means for longitudinally vibrating said rod at said resonance frequency of the latter, said rod having a length equal to $\lambda/4+(n-1)\lambda/2$, in which $\lambda$ is the wavelength of the standing wave on the rod at the resonance frequency of the latter for infinite compliance at said tip and $n$ is a whole integer, a body joined to the other end of said rod and having a mechanical impedance at least ten times greater than the mechanical impedance of said rod so that the resonance frequency of said rod is subject to relatively large changes in response to changes in said compliance at the area of contact of said tip with the test piece, means for applying a constant axial force to said rod for holding said tip in steady contact with the test piece, and means for indicating the resonance frequency of the rod as a function of the surface characteristics of the test piece.

10. A device for indicating the surface characteristics of a test piece comprising an elongated metal rod having a tip at one end with a rounded contact surface adapted to engage the test piece so that the resonance frequency of said rod is dependent upon the compliance at the area of contact of said tip with the test piece, electrically energized means for longitudinally vibrating said rod at a particular resonance frequency of the latter, said rod having a length equal to $\lambda/4+(n-1)\lambda/2$, in which $\lambda$ is the wavelength of the standing wave on the rod at the resonance frequency of the latter for infinite compliance at said tip and $n$ is a whole integer, a body joined to the other end of said rod and having a mechanical impedance at least ten times greater than the mechanical impedance of said rod so that the resonance frequency of said rod is subject to relatively large changes in response to changes in said compliance at the area of contact of said tip with the test piece, and means for applying an axial force to said rod for holding said tip in steady contact with the test piece and having a magnitude sufficient to provide a compliance at said area of contact causing resonance of the rod at said particular frequency, whereby the magnitude of said axial force is a function of the surface characteristics of the test piece.

11. A device for indicating the magnitude of a force comprising an abutment member, an elongated metal rod having a tip at one end with a rounded contact surface engageable with said member so that the resonance frequency of said rod is dependent upon the compliance at the area of contact of said tip with said member which is, in turn, dependent upon the force with which said tip is pressed against said member, electrically energized means for longitudinally vibrating said rod at said resonance frequency of the latter, said rod having a length equal to $\lambda/4+(n-1)\lambda/2$, in which $\lambda$ is the wavelength of the standing wave on the rod at the resonance frequency of the latter for infinite compliance at said tip and $n$ is a whole integer, a body joined to the other end of said rod and having a mechanical impedance at least ten times greater than the mechanical impedance of said rod so that the resonance frequency of said rod is subject to relatively large changes in response to changes in said force with which the tip is pressed against said member, means for applying the force to be measured to said rod for urging the latter in the direction toward said member, and means for indicating the resonance frequency of said rod as a function of the force to be measured.

12. A device as in claim 11; wherein said body is formed as an axial extension of said rod having a cross-sectional area at least ten times greater than the cross-sectional area of said rod, said body having a flange at the end thereof adjacent said rod; and
wherein said means for applying the force to be measured to said rod acts against said flange at which the amplitude of vibration is minimal even when the resonance frequency is substantially greater than that for infinite compliance at the tip, thereby to avoid significant damping of the vibration of the rod.

13. In a resonant sensing device including an elongated sensor having a tip with a rounded contact surface adapted to engage a solid member so that the resonance frequency of the sensor is dependent upon the compliance at the area of contact of said surface with the solid member, electrically energized means for longitudinally vibrating said sensor at resonance frequencies thereof, and means for applying an axial force to the sensor in the direction for holding the contact surface of the tip in steady contact with the solid member:
said sensor comprising a rod having a length equal to $\lambda/4+(n-1)\lambda/2$, in which $\lambda$ is the wavelength of the standing wave on the sensor at the resonance frequency of the latter when said compliance is infinite and $n$ is a whole integer, said tip being disposed at one end of said rod, and a body joined to the other end of said rod and having a mechanical impedance very substantially greater than the mechanical impedance of said rod so that the resonance frequency of said sensor is relatively sensitive to changes in said compliance at the area of contact as determined by the surface characteristics of the engaged solid member and by the magnitude of said force.

14. In a resonant sensing device, a sensor as in claim 13; wherein said mechanical impedance of the body is at least ten times as great as the mechanical impedance of said rod.

15. In a resonant sensing device, a sensor as in claim 14; wherein said body is formed as an axial extension of said rod having a cross-sectional area at least ten times greater than the cross-sectional area of said rod, and said sensor further has a flange extending from said body at the end of the latter adjacent said rod and adapted to receive said axial force while avoiding significant damping of the vibration of the sensor.

References Cited by the Examiner

UNITED STATES PATENTS

| | | |
|---|---|---|
| 2,514,080 | 7/1950 | Mason _____ 73—67.2 X |
| 2,991,594 | 7/1961 | Brown et al. |
| 3,100,390 | 8/1963 | Banks _____ 73—67.1 X |

RICHARD C. QUEISSER, *Primary Examiner.*